Oct. 9, 1945.　　H. L. NORTHUP　　2,386,496
SEAL
Filed Feb. 5, 1944
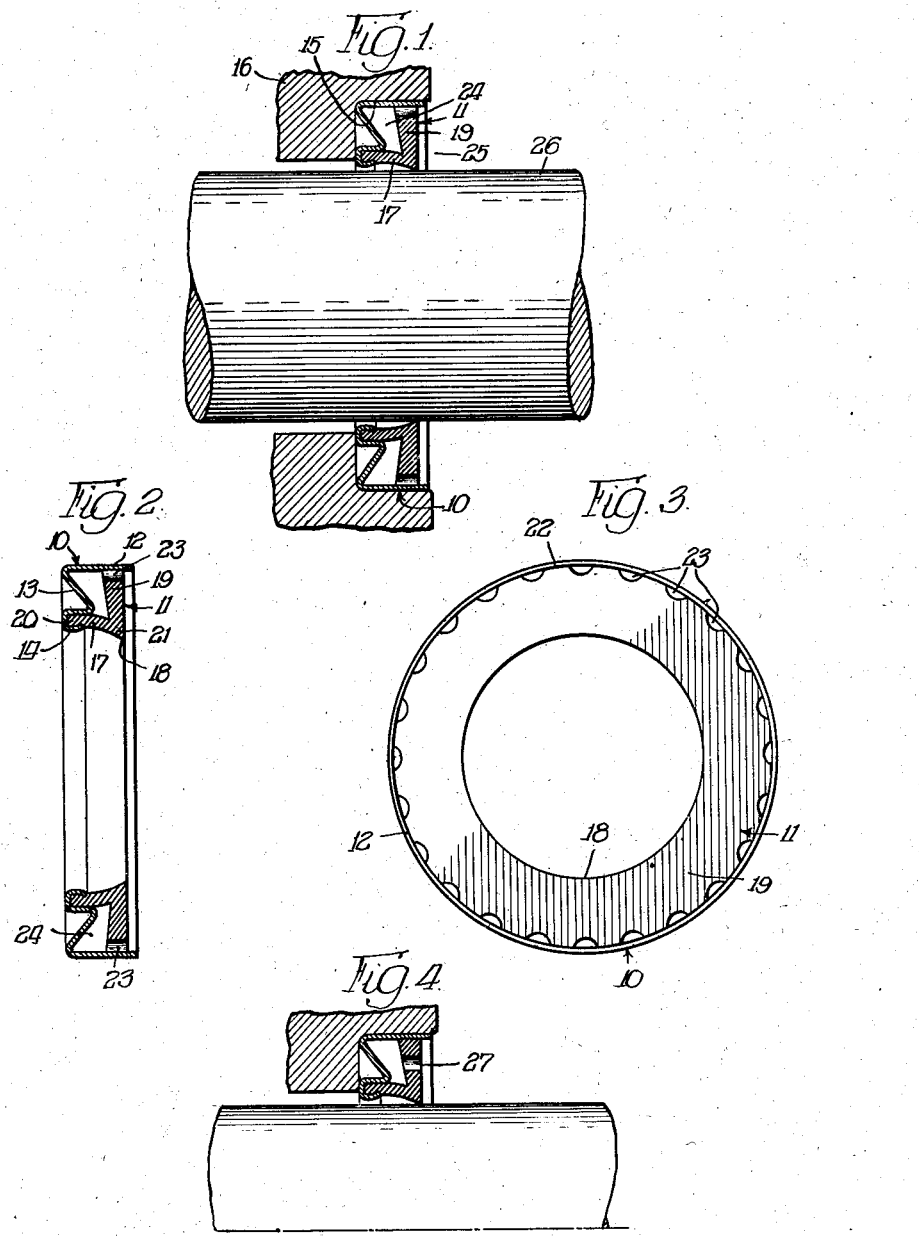
INVENTOR.
Harry L. Northup,
BY
Cromwell, Greist & Warden
Attys.

Patented Oct. 9, 1945

2,386,496

UNITED STATES PATENT OFFICE 2,386,496

SEAL

Harry L. Northup, Chicago, Ill., assignor to Chicago Rawhide Manufacturing Company, Chicago, Ill., a corporation of Illinois Application February 5, 1944, Serial No. 521,205

3 Claims. (Cl. 288—3)

This invention has to do with seals of the type commonly used in machines of various kinds about moving shafts for preventing the escape of oil or other fluids along the shafts.

The principal object of the invention is to provide an improved seal of the type described which is quite inexpensive to manufacture and yet when installed will function efficiently for the purpose for which designed.

The improved seal is a self-contained unit which is adapted for press fit insertion within an annular recess in a housing about a centrally arranged shaft. It includes an outer casing of sheet metal or other rigid material and an inner sealing element of synthetic rubber or other resiliently compressible material, which sealing element is sleeved out along the shaft, is provided at one end with a lip for sealed engagement with the shaft, and is so associated with the casing as to effectively maintain the lip in sealed engagement with the shaft throughout the normal life of the seal without recourse to the use of springs or other additional constrictive means.

While the foregoing statements are indicative in a general way of the nature of the invention, other more specific objects and advantages will be apparent to those skilled in the art upon a full understanding of the construction of the new seal.

Two embodiments of the invention are presented herein by way of exemplification, but it will of course be understood that the invention is susceptible of incorporation in still other structurally modified forms coming equally within the scope of the appended claims.

In the accompanying drawing:

Fig. 1 is a diametric section through a seal constructed in accordance with the invention, showing the seal press fitted into an annular recess in a housing about a centrally arranged shaft;

Fig. 2 is a similar view, showing the seal before being installed;

Fig. 3 is a face view of the seal; and

Fig. 4 is a radial section through another seal constructed in accordance with the invention, showing a modified arrangement of the pressure equalizing ports.

The seal shown in Figs. 1 to 3, inclusive, comprises a metal casing 10 and a synthetic rubber packing 11. The casing 10 is a one-piece centrally apertured cup of generally L-shaped radial section which is characterized by a cylindrical rim portion 12, a radially extending bottom portion 13 and an axially opening channel portion 14. The rim portion 12 of the casing is adapted to be press fitted into an annular recess 15 in a housing 16. The channel portion 14 is located about the central aperture in the bottom portion 13, in substantially spaced relation to the rim portion 12.

The packing 11 is a one-piece ring of generally L-shaped radial section which is characterized by an axially extending sleeve portion 17, an annular lip portion 18, and a radially extending flange portion 19. The sleeve portion 17 has a large diameter end 20 and a small diameter end 21. The lip portion 18 is located at the small diameter end 21 of the sleeve portion, and the flange portion 19 extends outwardly from the small diameter end 21 in substantially the plane of the lip portion 18, increasing outwardly in thickness.

The packing 11 is positioned within the casing 10 with the sleeve portion 17 of the packing in generally parallel spaced relation to the rim portion 12 of the casing and with the flange portion 19 of the packing in generally parallel spaced relation to the bottom portion 13 of the casing. The large diameter end 20 of the sleeve portion 17 of the packing is tightly clamped within the channel portion 14 of the casing in fluid-tight association with the latter, while the outer periphery 22 of the flange portion 19 of the packing is arranged in substantially right-angular abutment with the inner surface of the rim portion 12 of the casing adjacent the edge of the rim portion. The flange portion 19 is provided about its outer periphery with a plurality of openings 23 which place the hollow interior 24 of the seal in communication with the space 25 in front of the seal, thereby equalizing the pressure at the opposite faces of the flange portion 19.

When the seal is positioned in place about a shaft 26 the lip portion 18 of the packing will be distended slightly by the shaft and the surrounding flange portion 19 will be correspondingly compressed within the confining rim portion 12 of the casing.

In the modification shown in Fig. 4 the pressure equalizing openings 27 are located in the flange portion of the packing at a point inwardly of the outer periphery of the latter.

I claim:

1. In a seal of the character described, a centrally apertured cup, and a packing ring of resiliently compressible material positioned in the cup, said packing ring having an axially extending sleeve portion which is connected at its far end with the bottom of the cup in fluid-tight association with the latter and having a flange portion which extends outwardly into abutment with the inner surface of the rim of the cup.

2. In a seal of the character described, a centrally apertured cup having a rim portion, and a bottom portion which extends inwardly from one end of the rim portion; a packing ring of resiliently compressible material having a sleeve portion provided with a large diameter end and a small diameter end, a lip portion within the small diameter end of the sleeve portion, and a flange portion which extends outwardly from the small diameter end of the sleeve portion in substantially the plane of the lip portion; the large diameter end of the sleeve portion being secured to the bottom portion of the cup in fluid-tight association with the latter; and the outer periphery of the flange portion being positioned against the inner surface of the rim portion of the cup in spaced relation to the bottom portion of the latter; said flange portion being provided outwardly of the small diameter end of the sleeve portion with one or more openings.

3. In a seal of the character described, a centrally apertured cup of generally L-shaped radial section, which cup has a rim portion, a bottom portion which extends inwardly from one end of the rim portion, and a channel portion about the opening in the center of the bottom portion; a resiliently compressible packing ring of generally L-shaped radial section, which packing ring has a sleeve portion provided with a large diameter end and a small diameter end, a lip portion within the small diameter end of the sleeve portion, and a flange portion which extends outwardly from the small diameter end of the sleeve portion in substantially the plane of the lip portion; said flange portion increasing in thickness toward its outer periphery; the large diameter end of the sleeve portion of the packing ring being clamped within the channel portion of the casing in fluid-tight association with the latter; and the outer relatively thick periphery of the flange portion being confined under compression within the rim portion of the cup in spaced relation to the bottom portion of the latter; said flange portion being provided outwardly of the small diameter end of the sleeve portion with one or more openings.

HARRY L. NORTHUP.